(12) United States Patent
Takayama

(10) Patent No.: US 6,621,650 B1
(45) Date of Patent: Sep. 16, 2003

(54) RECORDING MEDIUM AND TAPE DRIVING APPARATUS

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/456,992

(22) Filed: Dec. 7, 1999

(30) Foreign Application Priority Data

Dec. 8, 1998 (JP) .......................................... 10-348465

(51) Int. Cl.⁷ ................................................ G11B 19/02
(52) U.S. Cl. ............................. 360/69; 360/48; 360/71
(58) Field of Search ............................... 360/48, 69, 71

(56) References Cited

U.S. PATENT DOCUMENTS

| | | | | |
|---|---|---|---|---|
| 5,852,534 A | * | 12/1998 | Ozue et al. | .................... 360/69 |
| 5,901,004 A | * | 5/1999 | Kikuchi et al. | ............... 360/53 |
| 6,134,066 A | * | 10/2000 | Takayama et al. | ............ 360/60 |
| 6,182,191 B1 | * | 1/2001 | Fukuzono et al. | .......... 711/111 |
| 6,204,985 B1 | * | 3/2001 | Ono et al. | ..................... 360/69 |
| 6,304,716 B1 | * | 10/2001 | Hanai et al. | .................. 386/95 |
| 6,327,109 B1 | * | 12/2001 | Kori et al. | ................. 360/72.1 |

* cited by examiner

*Primary Examiner*—David Hudspeth
*Assistant Examiner*—Mitchell Slavitt
(74) *Attorney, Agent, or Firm*—Jay H. Maioli

(57) ABSTRACT

A tape driving apparatus, and a recording medium, which allows the management of a tape cassette for storing data to be tightened and allows an empty area in a partition to be managed. An initialize count indicating a number of times of initialization of a magnetic tape is defined and is stored in a memory in cassette device of the tape cassette. The initialize count allows the number of times of initialization implemented at least on the magnetic tape of that tape cassette to be grasped. It then becomes possible to estimate a degree of damage of the magnetic tape more accurately by using information capable of indicating a number of times of error, such as Total C3 ECC Retries.

5 Claims, 14 Drawing Sheets

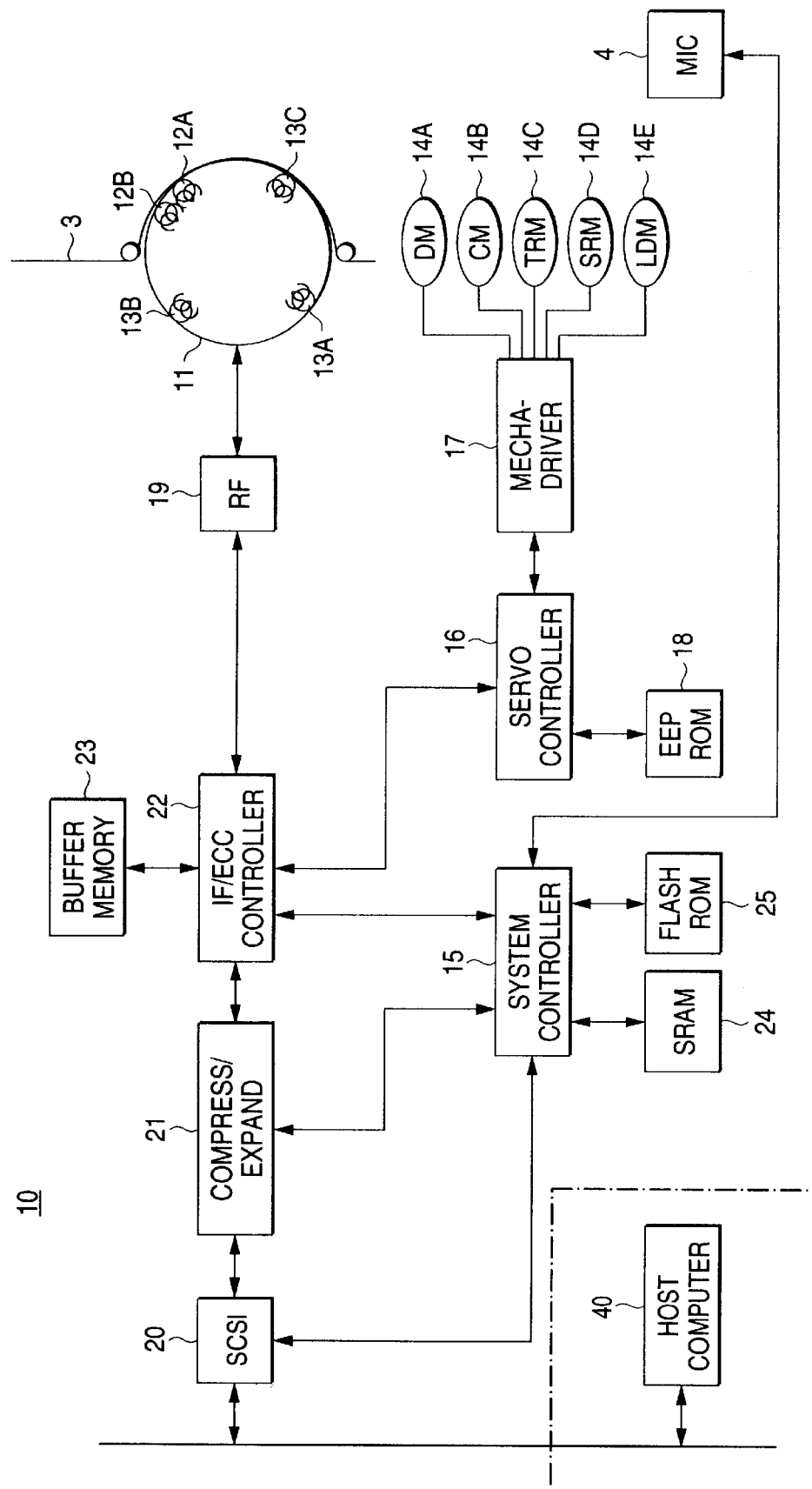

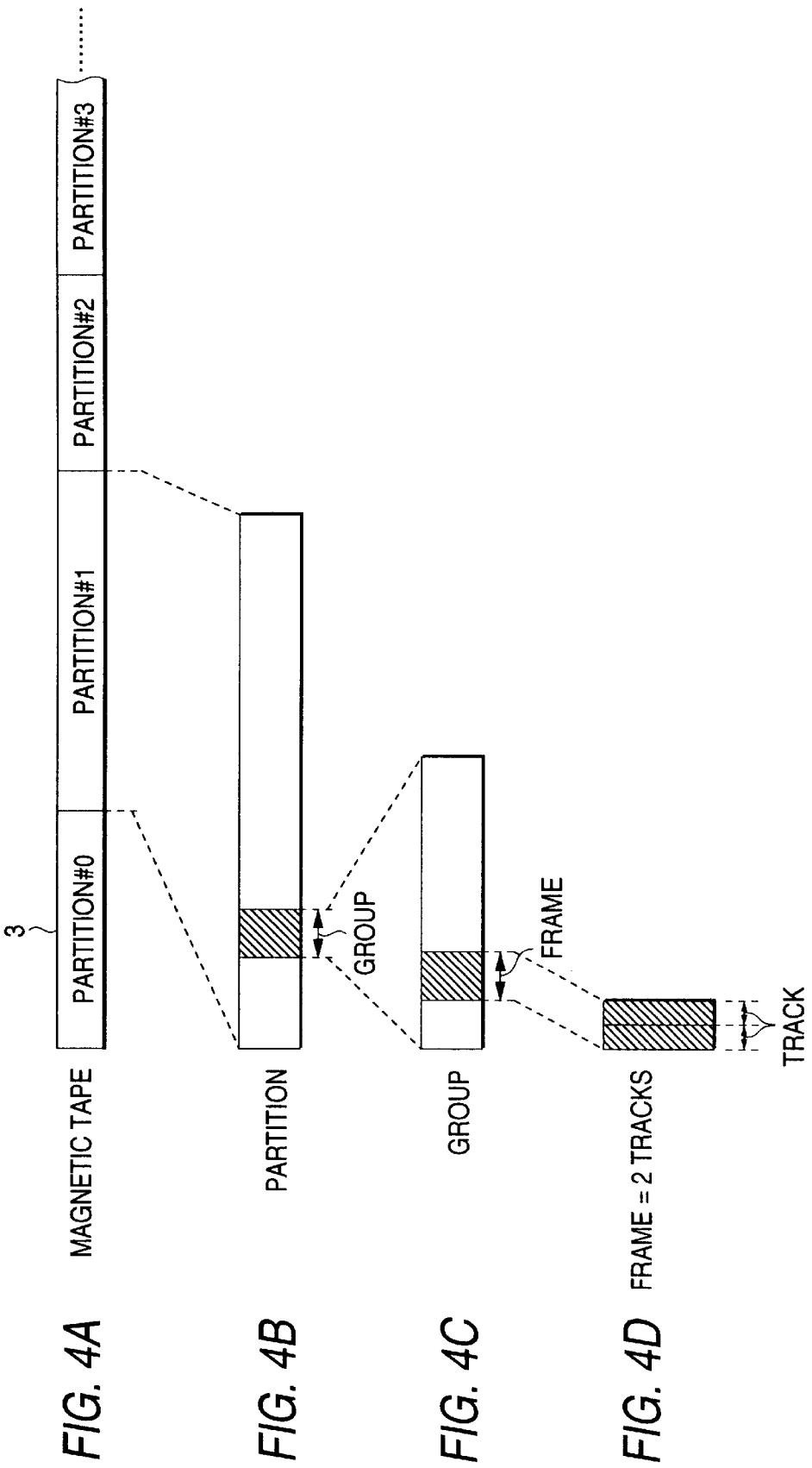

FIG. 8

| MANUFACTURE INFORMATION (FL1) | | |
|---|---|---|
| | MANUFACTURE PART CHECKSUM | 1 BYTE |
| | MIC TYPE | 1 BYTE |
| | MIC MANUFACTURE DATE | 4 BYTES |
| | MIC MANUFACTURE LINE NAME | 8 BYTES |
| | MIC MANUFACTURE PLANT NAME | 8 BYTES |
| | MIC MANUFACTURE NAME | 8 BYTES |
| | MIC NAME | 8 BYTES |
| | CASSETTE MANUFACTURE DATE | 4 BYTES |
| | CASSETTE MANUFACTURE LINE NAME | 8 BYTES |
| | CASSETTE MANUFACTURE PLANT NAME | 8 BYTES |
| | CASSETTE MANUFACTURER NAME | 8 BYTES |
| | CASSETTE NAME | 8 BYTES |
| | OEM CUSTOMER NAME | 8 BYTES |
| | RESERVED | 1 BYTE |
| | PHYSICAL TAPE CHARACTERISTIC ID | 1 BYTE |
| | MAXIMUM CLOCK FREQUENCY | 2 BYTES  ~FL11 |
| | MAXIMUM WRITE CYCLE | 1 BYTE  ~FL12 |
| | MIC CAPACITY | 1 BYTE |
| | WRITE PROTECT START ADDRESS | 2 BYTES |
| | WRITE PROTECTED DATA BYTE COUNT | 2 BYTES |
| | RESERVED | 2 BYTES |

FIG. 10

| | | |
|---|---|---|
| FL31 { | VOLUME INFORMATION CHECKSUM | 1 BYTE |
| | VOLUME INFORMATION | 100 BYTES |
| FL32 | ACCUMULATIVE PARTITION INFORMATION CHECKSUM | 1 BYTE |
| | ACCUMULATIVE PARTITION INFORMATION | 56 BYTES |
| | VOLUME NOTE CHECKSUM | 1 BYTE |
| | VOLUME NOTE | 8 BYTES |
| | CARTRIDGE SERIAL NUMBER | 32 BYTES |
| | MANUFACTURER ID | 1 BYTE |
| | SECONDARY ID | 1 BYTE |
| | CARTRIDGE SERIAL NUMBER PART CHECKSUM | 1 BYTE |
| | RESERVED | 1 BYTE |
| VOLUME TAG (FL3) | SPECIFIC VOLUME TAG 1 | 36 BYTES |
| | SPECIFIC VOLUME TAG 2 | 36 BYTES |
| | SPECIFIC VOLUME TAG 3 | 36 BYTES |
| | SPECIFIC VOLUME TAG 4 | 36 BYTES |
| | SPECIFIC VOLUME TAG 5 | 36 BYTES |
| | SPECIFIC VOLUME TAG 6 | 36 BYTES |
| | SPECIFIC VOLUME TAG 7 | 36 BYTES |
| | SPECIFIC VOLUME TAG 8 | 36 BYTES |
| | SPECIFIC VOLUME TAG 9 | 36 BYTES |
| | SPECIFIC VOLUME TAG 10 | 36 BYTES |
| | SPECIFIC VOLUME TAG 11 | 36 BYTES |
| | SPECIFIC VOLUME TAG 12 | 36 BYTES |
| | SPECIFIC VOLUME TAG 13 | 36 BYTES |

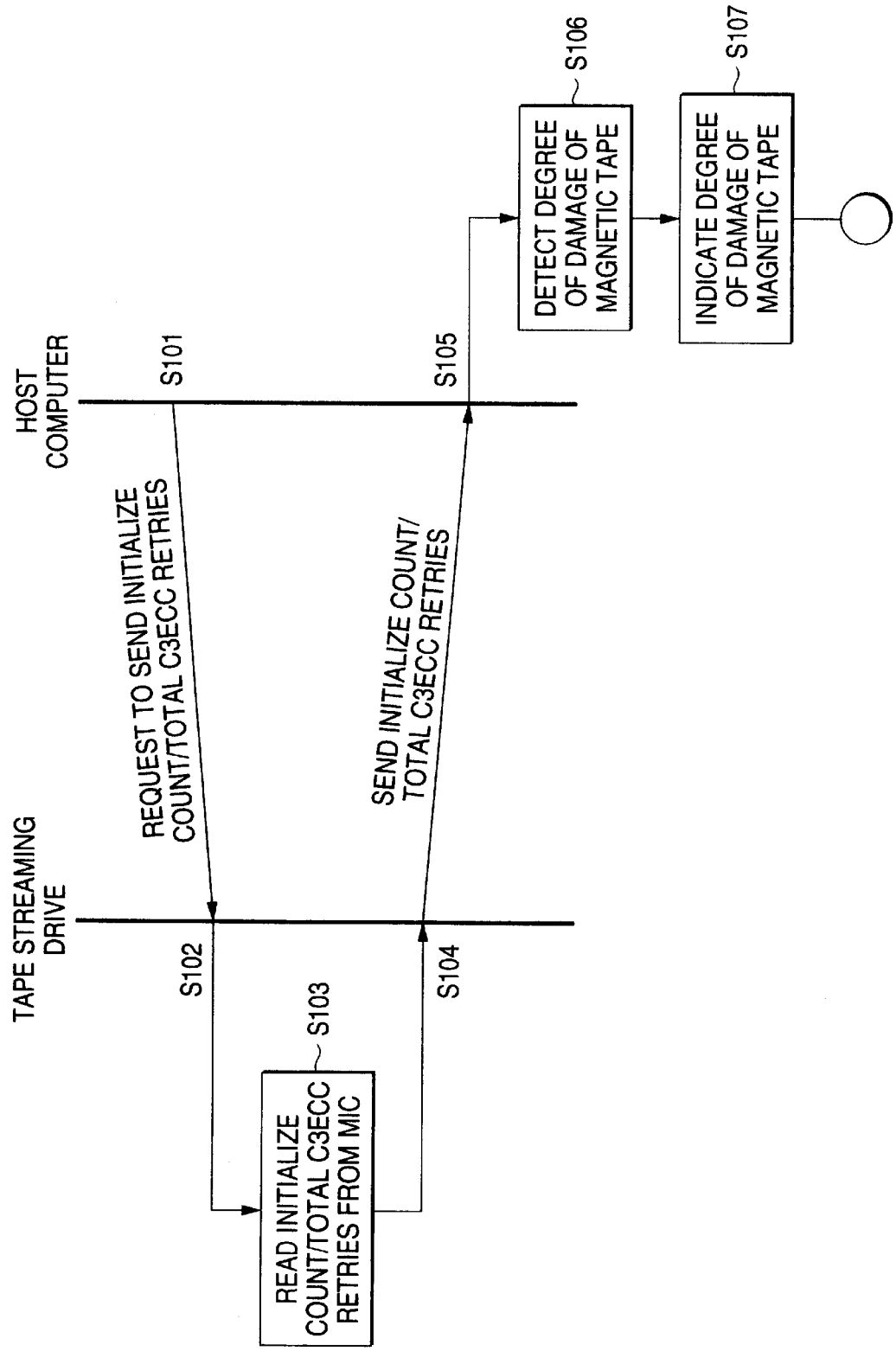

RECORDING MEDIUM AND TAPE DRIVING APPARATUS

BACKGROUND OF THE INVENTION

1. Field of the Invention

The present invention relates to a recording medium for use as a data storage and a tape driving apparatus accommodating a tape cassette as such recording medium.

2. Description of the Related Art

A so-called tape streaming drive has been known as a driving apparatus which is capable of recording/reproducing digital data to/from a magnetic tape. Although it depends on the length of the tape of the tape cassette, i.e., a medium, the tape streaming drive is capable of having an enormous amount of recording capacity of several tens to several hundreds giga bytes for example. Therefore, it is widely used for backing up data recorded in a medium such as a hard disk of a computer main body. It is also considered to be suitable for use in storing image data or the like whose data size is large.

Then, as the tape streaming drive as described above, there has been proposed one which is arranged so as to record/reproduce data by using a tape cassette of an 8 mm VTR as a recording medium and by adopting a helical scan scheme by means of a rotary head for example.

The tape streaming drive is arranged so as to allow the user to form a required number of and capacity of partitions on the magnetic tape of the tape cassette by initializing the magnetic tape.

Then, a management information recording area of a predetermined size in which various usage history information (or may be called management information) corresponding to the whole magnetic tape or the present partition is stored is formed at the head in each partition formed by the initialization. The tape streaming drive can record/reproduce data to/from the magnetic tape adequately by reproducing and obtaining the information recorded in the management information recording area.

By the way, no area for storing information indicating a number of times of initialization implemented on that magnetic tape has not been set in the management information recording area as history information on that magnetic tape.

It has been because the management information recording area which had been formed corresponding to partitions formed in advance must be also erased in restructuring the partitions and the management information recording area contained therein by the initialization. That is, the management information recording area is created a new every time when the initialization is carried out. Therefore, the tape streaming drive must have obtained the history information up to then in the stage before the initialization in order to record the management information accumulated regarding to the magnetic tape like the information indicating the number of times of initialization accurately in the management information recording area. However, its realization has been unrealistic because it is difficult technologically due to the limit of a memory and to the temporal limit for accessing to the whole management information recording area on the magnetic tape.

For instance, some user may naturally desire to grasp a number of times of initialization implemented on a specific tape cassette (magnetic tape) because it is considered that a magnetic tape on which initialization has been implemented by several times is liable to be damaged as compared to one initialized only once.

However, when no information on the number of times of initialization is stored in the tape cassette (magnetic tape) as described above, the user must write the number of times of initialization implemented on that tape cassette on something in order to grasp the number of times.

Thus, the tape streaming drive has had a problem that it is unable to manage the tape cassette fully because it had no information indicating the number of times of initialization implemented on the magnetic tape as usage the history information regarding to the tape cassette.

SUMMARY OF THE INVENTION

In view of the problem described above, it is an object of the invention to enable to tighten the management on a tape cassette used for storing data further. Specifically, a primary object of the invention is to allow the user to manage a number of times of initialization implemented on a magnetic tape.

To this end, a storage area for storing information on a number of times of initialization indicating a number of times of initialization implemented on a magnetic tape is set in a memory as information not initialized along the initialization implemented on the magnetic tape in an inventive recording medium comprising a tape cassette in which the magnetic tape is stored and the memory for storing management information for managing a recording/reproducing operation to/from the magnetic tape.

An inventive tape driving apparatus comprises tape driving means for recording/reproducing information to/from the magnetic tape when the tape cassette in which the magnetic tape is stored is loaded; memory driving means for reading/writing management information from/to the memory for storing management information for managing the recording/reproducing operation to/from the magnetic tape when it is provided in the loaded tape cassette; initializing means for initializing the magnetic tape of the loaded tape cassette; and control means for controlling the memory driving means so as to update the information on a number of times of initialization in correspondence to the initialization executed by the initializing means when the information on a number of times of initialization indicating a number of times of initialization implemented to the magnetic tape is stored in the memory of the loaded tape cassette as information not initialized along the initialization implemented on the magnetic tape.

Another inventive tape driving apparatus comprises tape driving means for recording/reproducing information to/from the magnetic tape when the tape cassette in which the magnetic tape is stored is loaded and memory driving means for reading/writing management information from/to the memory for storing management information for managing the recording/reproducing operation to/from the magnetic tape when it is provided in the loaded tape cassette. The memory driving means detects at least information on a number of times of initialization when the information on a number of times of initialization indicating a number of times of initialization implemented to the magnetic tape is stored in the memory of the loaded tape cassette as information not initialized along the initialization implemented on the magnetic tape.

According to the configuration described above, the information on a number of times of initialization indicating a number of times of initialization implemented to the magnetic tape of the tape cassette is stored in the memory device provided in the tape cassette as management information. Thereby, it becomes possible to grasp the number of times of initialization implemented to the magnetic tape of the tape cassette.

The specific nature of the invention, as well as other objects, uses and advantages thereof, will clearly appear from the following description and from the accompanying drawings in which like numerals refer to like parts.

BRIEF DESCRIPTION OF THE DRAWINGS

FIG. 3 is a block diagram of a tape streaming drive according to the embodiment of the invention;

FIGS. 4A through 4D are explanatory diagrams showing the structure of data on a magnetic tape;

FIG. 8 is a table for explaining Manufacture Part of the MIC of the embodiment;

FIG. 10 is a table for explaining Volume Tags of the MIC of the embodiment;

FIG. 15 is a process transition diagram showing an exemplary processing operation for recognizing a degree of damage of the magnetic tape from a host computer.

DESCRIPTION OF THE PREFERRED EMBODIMENTS

An embodiment of the present invention will be explained below.

Although the present applicant has previously proposed a tape cassette fitted with an nonvolatile memory and a tape driving apparatus forming a data storage system which is capable of recording/reproducing digital data in correspondence to the memory-fitted tape cassette, the present invention will be applied to this data storage system corresponding to the memory-fitted tape cassette in the present specification. It is noted that the nonvolatile memory provided in the tape cassette will be referred to as a MIC (Memory In Cassette) hereinafter.

The explanation will be given below in the following order:

1. Structure of Tape Cassette;
2. Structure of Tape Streaming Drive;
3. Structure of Data on Magnetic Tape;
4. Data Structure of MIC;
5. Mode of Usage of Initialize Count in Present Embodiment 1. Structure of Tape Cassette:

At first, the tape cassette fitted with the MIC accommodating to the tape streaming drive 10 of the present embodiment will be explained with reference to FIGS. 1 and 2.

Figure 1:
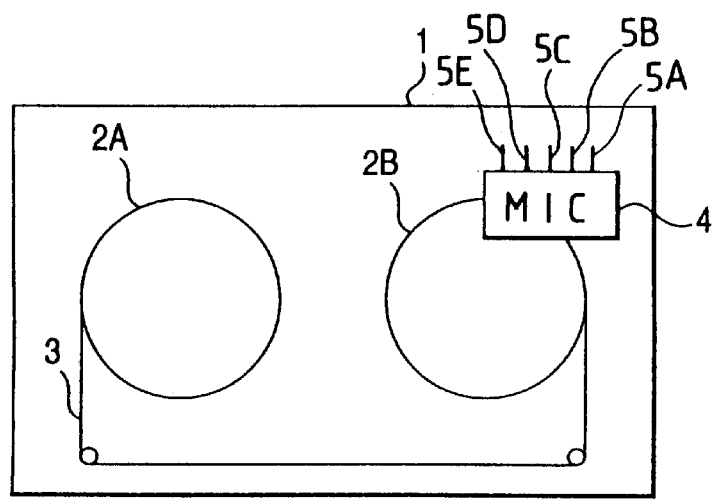
FIG. 1 is an explanatory diagram schematically showing the internal structure of a tape cassette according to one embodiment of the invention.

FIG. 1 conceptually shows the internal structure of the tape cassette 1, wherein reel hubs 2A and 2B are provided and a magnetic tape 3 of 8 mm in tape width is wound between the both reel hubs 2A and 2B.

The tape cassette 1 is provided with an MIC 4, i.e., the nonvolatile memory. From the module of the MIC 4, five terminals 5A, 5B, 5C, 5D and 5E are led out as a power terminal, a data input terminal, a clock input terminal, an earth terminal and a spare terminal, respectively. Although the detail will be described later, the MIC 4 stores information regarding to the manufacturing date and site of each tape cassette, to thickness, length and material of the tape and to the history of usage of recorded data per each partition formed on the tape 3 and user information. It is noted that the various information stored in the MIC 4 will be referred to also as "management information" in the present specification.

Figure 2:
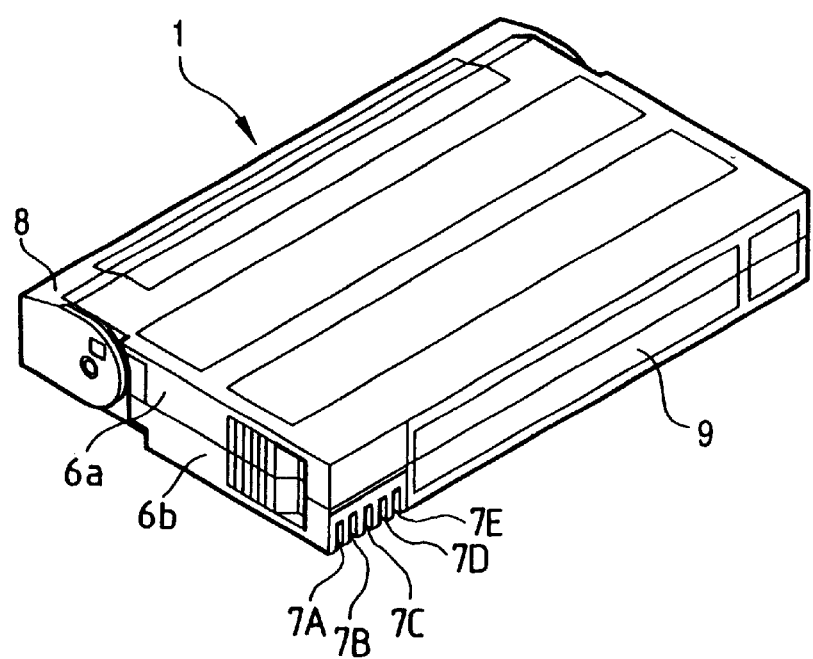
FIG. 2 is a perspective view showing the appearance of the tape cassette of the embodiment.

FIG. 2 shows the appearance of the tape cassette 1. The whole case is composed of an upper case 6a, a lower case 6b and a lid member 8 and is constructed basically in the same manner with a tape cassette used for the normal 8 mm VTRs. The tape cassette 1 is provided with terminal pins 7A, 7B, 7C, 7D and 7E on a labeling face 9 on the side of the tape cassette 1 to be connected respectively with the terminals 5A, 5B, 5C, 5D and 5E explained above in connection with FIG. 1. That is, in the present embodiment, the tape cassette 1 physically contacts with the tape streaming drive 10 described next via the terminal pins 7A, 7B, 7C, 7D and 7E to mutually transmit data signals and the like.

2. Structure of Tape Streaming Drive:

Next, the structure of a tape streaming drive 10 of the present embodiment will be explained with reference to FIG. 3. The tape streaming drive 10 records/reproduces data to/from the magnetic tape 3 in the loaded tape cassette 1 in a helical scan scheme.

A rotary drum 11 is provided with two recording heads 12A and 12B having different azimuth angles and three reproducing heads 13A, 13B and 13C having respective predetermined azimuth angles at certain angular intervals.

A drum motor 14A rotates the rotary drum 11 around which the magnetic tape 3 pulled out of the tape cassette 1 is wound.

A capstan motor 14B rotates and drives a capstan not shown for running the magnetic tape 3 at constant speed.

Reel motors 14C and 14D rotate and drive the reel hubs 2A and 2B within the tape cassette 1 in the normal and reverse directions, respectively.

A loading motor 14E drives a loading mechanism not shown to load/unload the magnetic tape 3 to/from the rotary drum 11.

A mecha-driver 17 applies power and rotatably drives the drum motor 14A, the capstan motor 14B, the reel motors 14C and 14D and the loading motor 14E. The mecha-driver 17 drives the respective motors based on controls made by a servo controller 16. The servo controller 16 controls the rotating speed of the respective motors to execute various operations such as running of the tape in recording/reproducing data normally, in quickly reproducing data and in quickly feeding and rewinding the tape, the tape cassette charging operation, the loading/unloading operation, the tape tension controlling operation and others.

Although not shown, the drum motor 14A, the capstan motor 14B, the reel motors 14C and 14C are provided with FGs (frequency generator), respectively, to be able to detect information on the rotation of the respective motors in order to enable the servo controller 16 to execute the servo control of the respective motors.

Then, discriminating the rotating speed of the respective motors based on those FG pulses, the servo controller 16 detects an error with intended rotating speed about the rotating operation of each motor and controls the mecha-driver 17 about the applied power corresponding to that error, thus realizing the control of the rotating speed by the closed loop. Accordingly, the servo controller 16 can control the respective motors so that they rotate at target rotating speeds corresponding to the respective operations during the various operations such as the normal run in recording/reproducing data, quick search, quick-feed, rewind and others.

An EEPROM 18 stores constants and others used by the servo controller 16 in servo-controlling the respective motors.

The servo controller 16 is bi-directionally connected with a system controller 15 for executing control processes of the whole system via an interface controller/ECC formatter 22 (hereinafter referred to as an IF/ECC controller).

In the tape streaming drive 10, an SCSI interface 20 is used for inputting/outputting data. For instance, data is inputted sequentially from a host computer 40 via the SCSI interface 20 in unit of transmission data of fixed length record and is supplied to a compressing/expanding circuit 21 in recording data. It is noted that there also exists a mode of transmitting data from the host computer 40 in unit of sets of variable length data in such tape streaming drive system.

The compressing/expanding circuit 21 implements a process for compressing the inputted data in a predetermined method as necessary. When a compressing method by means of LZ codes is adopted for example as one example of the compressing methods, dedicated codes are allocated to character strings processed in the past and are stored in a shape of a dictionary. Then, a character string inputted thereafter is compared with the contents of the dictionary and when it coincides with the code in the dictionary, the data of the character string is replaced with the code in the dictionary. When the data of the inputted character string does not coincide with the code in the dictionary, a new code is given thereto and is registered in the dictionary one after another. Thus, the data compression is carried out by registering data of inputted character strings in the dictionary and by replacing the character string data with the codes of the dictionary.

While the output of the compressing/expanding circuit 21 is supplied to the IF/ECC controller 22, the IF/ECC controller 22 stores the output of the compressing/expanding circuit 21 once in a buffer memory 23 by its control operation. The data stored in the buffer memory 23 is processed to be handled finally in unit of fixed length corresponding to 40 tracks of the magnetic tape of Group and is processed into an ECC format under the control of the IF/ECC controller 22.

As the ECC formatting process, an error correcting code is added to the recorded data and the data is modulated so as to fit with the magnetic recording. The data is then supplied to an RF processing section 19.

The RF processing section 19 implements processes such as amplification and record equalizing to the recorded data to generate a recording signal to be supplied to the recording heads 12A and 12B. Thereby, the data is recorded to the magnetic tape 3 from the recording heads 12A and 12B.

The data reproducing operation will be explained briefly. The reproducing heads 13A and 13B read the data recorded in the magnetic tape 3 as RF reproducing signals and the RF processing section 19 implements reproduction equalizing, generation of reproducing clocks, binarization, decoding (e.g., Viterbi decoding) and others on the reproduced output.

The signal thus read is supplied to the IF/ECC controller 22 to undergo an error correcting process and others at first. It is then stored temporarily in the buffer memory 23 and is read at predetermined point of time to be supplied to the compressing/expanding circuit 21.

Based on the judgment of the system controller 15, the compressing/expanding circuit 21 implements a data expanding process when the data is what has been compressed by the compressing/expanding circuit 21 during recording or outputs as it is without implementing the data expanding process when the data is non-compressed data.

The output data of the compressing/expanding circuit 21 is outputted to the host computer 40 as reproduced data via the SCSI interface 20.

The figure also shows the MIC 4 together with the magnetic tape 3 of the tape cassette 1. When the main body of the tape cassette is charged to the tape streaming drive, the MIC 4 is connected so as to be able to input/output data to/from the system controller 15 via the terminal pins 7A through 7E shown in FIG. 2. Thereby, the system controller 15 can read or update the management information recorded in the MIC 4.

Information is transmitted mutually between the MIC 4 and the external host computer 40 by using SCSI commands. Therefore, it is not necessary to provide a dedicated line specifically between the MIC 4 and the host computer 40 and data can be exchanged between the tape cassette and the host computer 40 just by connecting the SCSI interface as a result.

While information is transmitted mutually between the tape streaming drive 10 and the host computer 40 by using the SCSI interface 20 as described above, the host computer 40 makes various communications with the system controller 15 by using the SCSI commands.

Accordingly, the host computer 40 can instruct the system controller 15 by the SCSI command to write/read data to/from the MIC 4.

An S-RAM 24 and a flash ROM 25 store data used by the system controller 15 for the various processes.

For instance, the flash ROM 25 stores constants and others used for the control. The S-RAM 24 is used as a work memory, as a memory for storing data read/written from/to the MIC 4, mode data set in unit of tape cassette and various flag data or as a memory used for arithmetic processes.

It is noted that the S-RAM 24 and the flash ROM 25 may be constructed as an internal memory of a microcomputer composing the system controller 15 or part of an area of the buffer memory 23 may be used as a work memory.

3. Structure of Data on Magnetic Tape:

Next, a format of data on the magnetic tape 3 in the tape cassette 1 which is recorded/reproduced by the tape streaming drive 10 described above will be explained.

FIGS. 4A through 4D show the structure of data recorded in the magnetic tape 3, wherein FIG. 4A schematically shows one magnetic tape 3. According to the present embodiment, one magnetic tape 3 is divided to be able to use in unit of Partition as shown in FIG. 4A and in case of the present system, to be able to set and manage 256 partitions in maximum. Each partition shown in the figure is managed by Partition No. given as described as Partition #0, #1, #2, #3, . . . .

Accordingly, it is possible to record/reproduce data independently per partition in the present embodiment. For instance, the recording unit of data within one partition shown in FIG. 4B may be divided into a unit of fixed length called Group as shown in FIG. 4C and the data is recorded to the magnetic tape 3 in the unit of this group.

In this case, one group corresponds to a data amount of 20 Frames and one frame is composed of two Tracks as shown in FIG. 4D. The two tracks composing one frame are plus azimuth and minus azimuth tracks adjacent to each other. Accordingly, one group is composed of 40 tracks.

Figure 5A:
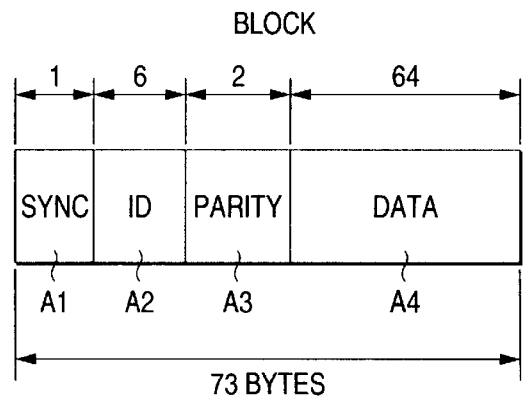
FIGS. 5A through 5C are explanatory diagrams showing the structure of a track.
Figure 5B:
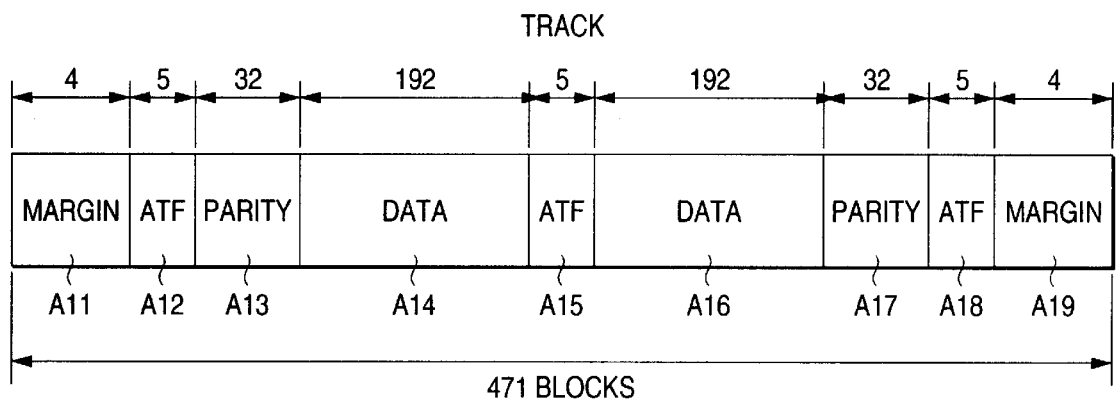

FIGS. 5A and 5B show the structure of data of one track shown in FIG. 4D. FIG. 5A shows the data structure in unit of Block. One block is composed of ID Area A2 of 6 bytes used for Search and the like following to SYNC Data Area A1 of 1 byte, Error Correcting Parity Area A3 composed of 2 bytes for ID data and Data Area A4 of 64 bytes.

Then, data of one track shown in FIG. 5B is composed of 471 blocks in total. One track is provided with Margin Areas A11 and A19 of four blocks at the both ends as shown in the figure and with tracking controlling ATF Areas A12 and A18 after the Margin Area A11 and before the Margin/Area A19. Further, it is provided with Parity Areas A13 and A17 after the AFT Area A12 and the before the ATF Area A18. An area of 32 blocks are provided for the Parity Areas A13 and A17.

It is also provided with an ATF Area 15 at the middle of one track and an area of five blocks is provided for the ATF Areas A12, A15 and A18. Then, Data Areas A14 and A16 of 192 blocks each are provided between the Parity Area A13 and the ATF area A15 and between the ATF Area A15 and the Parity Area A17, respectively. Accordingly, the whole Data Area (A14 and A16) within one track occupies 192× 2=384 blocks in 471 blocks in total.

Figure 5C:
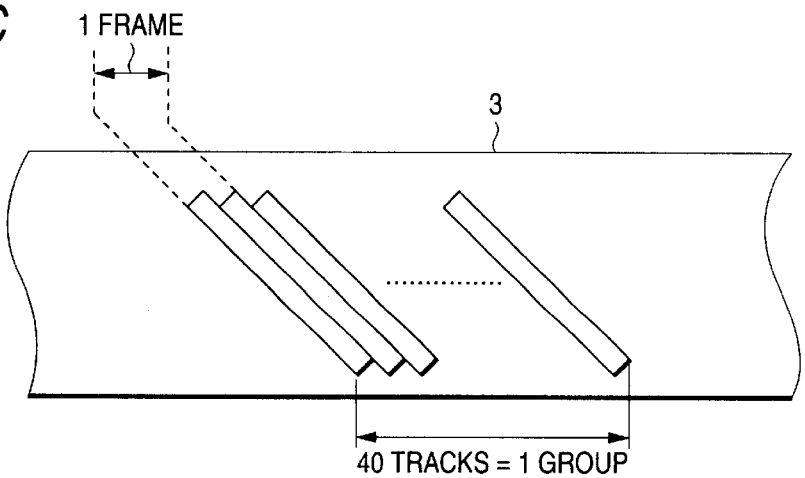

Then, the track is recorded physically on the magnetic tape 3 as shown in FIG. 5C and 40 tracks (=20 frames) compose one group as described before.

Figure 6A:
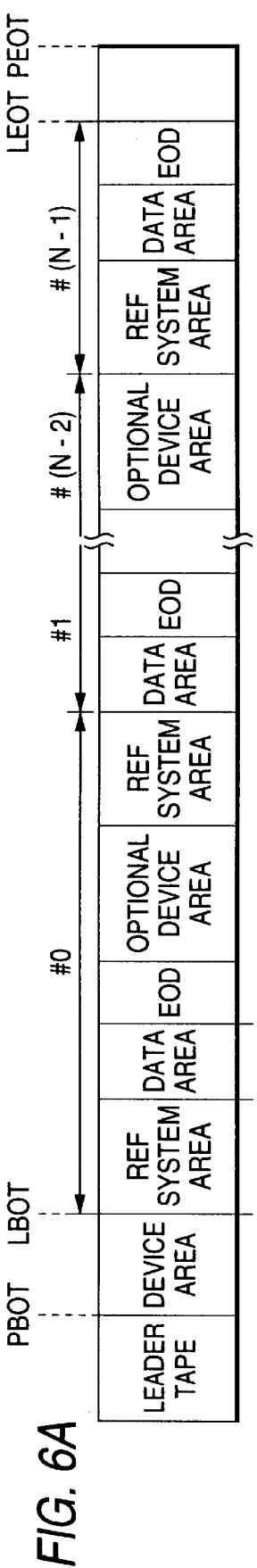
FIGS. 6A through 6C are explanatory diagrams showing the structure of an area on the magnetic tape.
Figure 6B:
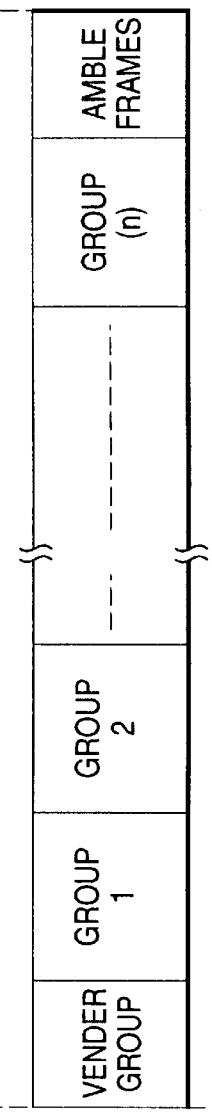
Figure 6C:
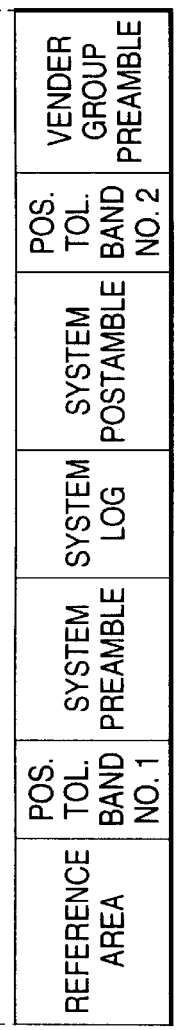

The data is recorded on the magnetic tape 3 explained in FIGS. 4 and 5 with the area structure shown in FIGS. 6A through 6C.

It is noted that a case in which N partitions from #0 to #N−1 are formed will be exemplified here.

Leader Tape is positioned physically at the head portion of the magnetic tape 3 as shown in FIG. 6A and Device Area which is an area for loading/unloading the tape cassette is provided next. The head of this Device Area is PBOT (Physical Beginning of Tape).

Following to the Device Area described above, there are provided Reference Area with regard to Partition #0 and System Area (this area including the reference area will be called as System Area hereinbelow) in which information on history of use of the tape for example is stored. Data Area is provided following to that. The head of the System Area is LBOT (Logical Beginning of Tape).

Formed in this System Area are Reference Area, Position Tolerance Band NO. 1, System Preamble, System Log, System Postamble, Position Tolerance Band NO. 2 and Vendor Group Preamble as shown largely in FIG. 6C.

In the Data Area following to the System Area, Vendor Group in which information on a vendor who creates and supplies the data at first is shown is provided and the groups shown in FIG. 4C, i.e., a plurality of Groups shown as Group 1, . . . Group (n) here, are formed continuously as shown largely in FIG. 6B. Then, Amble Frame is disposed after the final Group (n).

Following to such Data Area, an area of EOD (End of Data) indicating the end of the data area of the partition is provided as shown in FIG. 6A.

When only one partition is created, the end of the EOD of that Partition #0 is LEOT (Logical End of Tape). However, because the N partitions are created in this case, Optional Device Area is created following to the EOD of Partition #0.

While Device Area from the head position PBOT is the area for loading/unloading data corresponding to Partition #0, the Optional Device Area at the end of Partition #0 is an area for loading/unloading corresponding to Partition #1.

For Partition #1, areas are formed in the same manner with Partition #0 and Optional Device Area which is an area for loading/unloading corresponding to the next Partition #2 is formed at the end thereof.

Thereafter, partitions up to Partition #(N−1) are formed in the same manner.

It is noted that in the last Partition (N−1), no Optional Device Area is formed because it is not necessary and the end of EOD of Partition #(N−1) is LEOT (Logical End of Tape).

PEOT (Physical End of Tape) indicates the physical end of the tape or the physical end of Partition.

4. Data Structure of MIC:

Next, the data structure of the MIC 4 provided in the tape cassette 1 will be explained.

Figure 7:
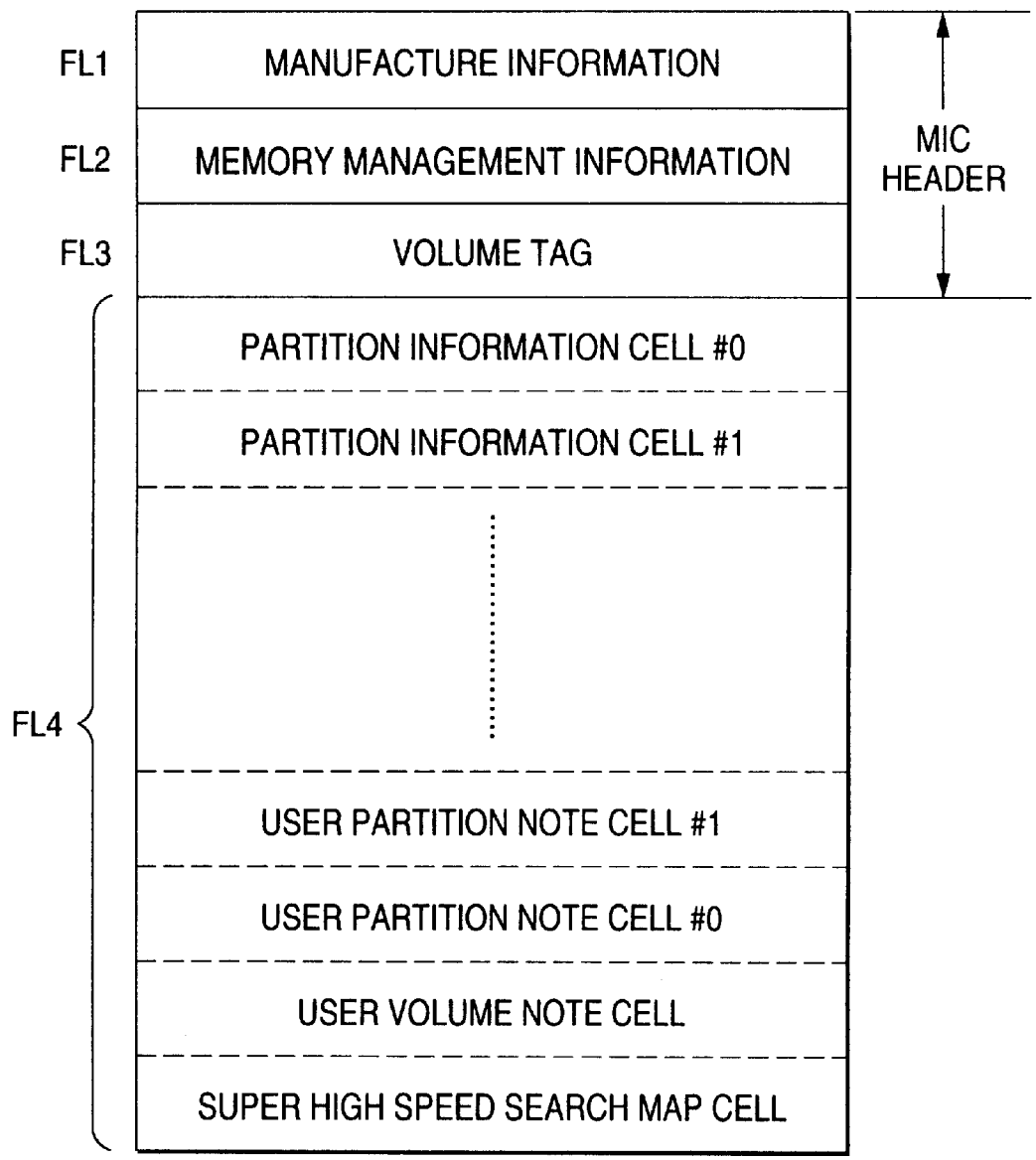
FIG. 7 is a table for explaining the structure of a MIC of the embodiment.

FIG. 7 is a schematic diagram showing one example of the structure of data stored in the MIC 4. Fields FL1 through FL4 are set as shown in the figure as storage areas of the MIC 4.

Various information in manufacturing the tape cassette, tape information at the time of initialization and information per partition are written to these fields FL1 through FL4.

Manufacture Information is stored in the field FL1. That is, it is a manufacture part in which various information in manufacturing the tape cassette is mainly stored.

Memory Management Information is stored in the field FL2. That is, it is Drive Initialize Part in which information at the time of initialization is mainly stored.

Volume Tag is stored in the field FL3. That is, fundamental management information of the whole tape cassette is stored therein.

Field FL4 is a memory free pool area in which management information may be stored additionally. A history of recording/reproducing operations and various information are stored as necessary in this memory free pool. It is noted that one unit of data group stored in the memory free pool will be called as "cell" hereinafter.

At first, Partition Information Cells #0, #1, . . . which are management information corresponding to each partition are written one after another from the head of the memory free pool corresponding to Partitions formed on the magnetic tape 3. That is, Partition Information Cells are formed as the same number of cells with the Partitions formed on the magnetic tape 3.

Super High Speed Search Map Cell as map information for high speed search is written from the rear end side of the memory free pool.

Following that, User Volume Note Cell and User Partition Note Cell are written from the rear end side. User Volume Note Cell is information such as a comment inputted by the user concerning to the whole tape cassette and User Partition Note Cell is information such as a comment inputted by the user concerning each partition. Accordingly, these are stored when the user instructs to do so and all of these are not necessarily described.

Intermediate areas in which no such information is stored are left as they are as the memory free pool to be written later.

It is noted that Manufacture Information (Field FL1), Memory Management Information (Field FL2) and Volume Tag (Field FL3) are handled as an area called the MIC header on the format. The information stored in the MIC header is not cleared along the initialization of the magnetic tape 3 in principle and the information in the remaining area of the memory free pool as the Field FL4 is information to be cleared along the initialization of the magnetic tape 3.

Manufacture Information in the field FL 1 has the structure as shown in FIG. 8 for example. It is noted that a size (number of bytes) of each data is indicated on the right side.

In the manufacture information, checksum information on the data of the manufacture information is stored as manufacture part checksum at the first 1 byte. The information of this manufacture part checksum is given in manufacturing the cassette.

Then, information from MIC type (mic type) to Write Protect Data Byte Count is described as actual data composing the manufacture part. It is noted that Reserved indicates an area reserved for storing data in the future. The same applies to the explanation hereinbelow.

MIC type is data indicating a type of MIC actually provided in the tape cassette concerned.

MIC manufacture date indicates the date (and time) when the MIC concerned was manufactured.

MIC manufacture line name indicates information on the name of a line on which the MIC was manufactured.

MIC manufacture plant name indicates information on the name of a factory in which the MIC was manufactured.

MIC manufacturer name indicates information on the name of a manufacturer of the MIC.

MIC name indicates information on the vendor of the MIC.

Cassette manufacture date, cassette manufacture line name, cassette manufacture plant name, cassette manufacturer name and cassette name describe information on the cassette itself similarly to the information on the MIC described above.

Information on the name of a customer company of OEM is stored in OEM (Original Equipment Manufacture) customer name.

Information on physical characteristic ID indicates information on the physical characteristics of the magnetic tape such as the material, thickness and length of the tape.

Information indicating the maximum clock frequency dealt by the MIC concerned is stored in maximum clock frequency.

Maximum write cycle indicates information on that how many bytes of data may be transferred by one time of communication with the tape streaming drive 10 as the characteristic of the MIC. This information depends on the physical characteristics of a nonvolatile memory used as the MIC.

MIC capacity indicates information on a storage capacity of the MIC concerned.

Write protect start address is used to prohibit to write into a certain area of the MIC and indicates a starting address of a write protected area.

Write protected data byte count indicates a number of bytes of the write protected area. That is, an area from the address specified by the write protect start address to the area occupied by the number of bytes indicated by the area of the write protect count is set as the write protected area.

Figure 9:
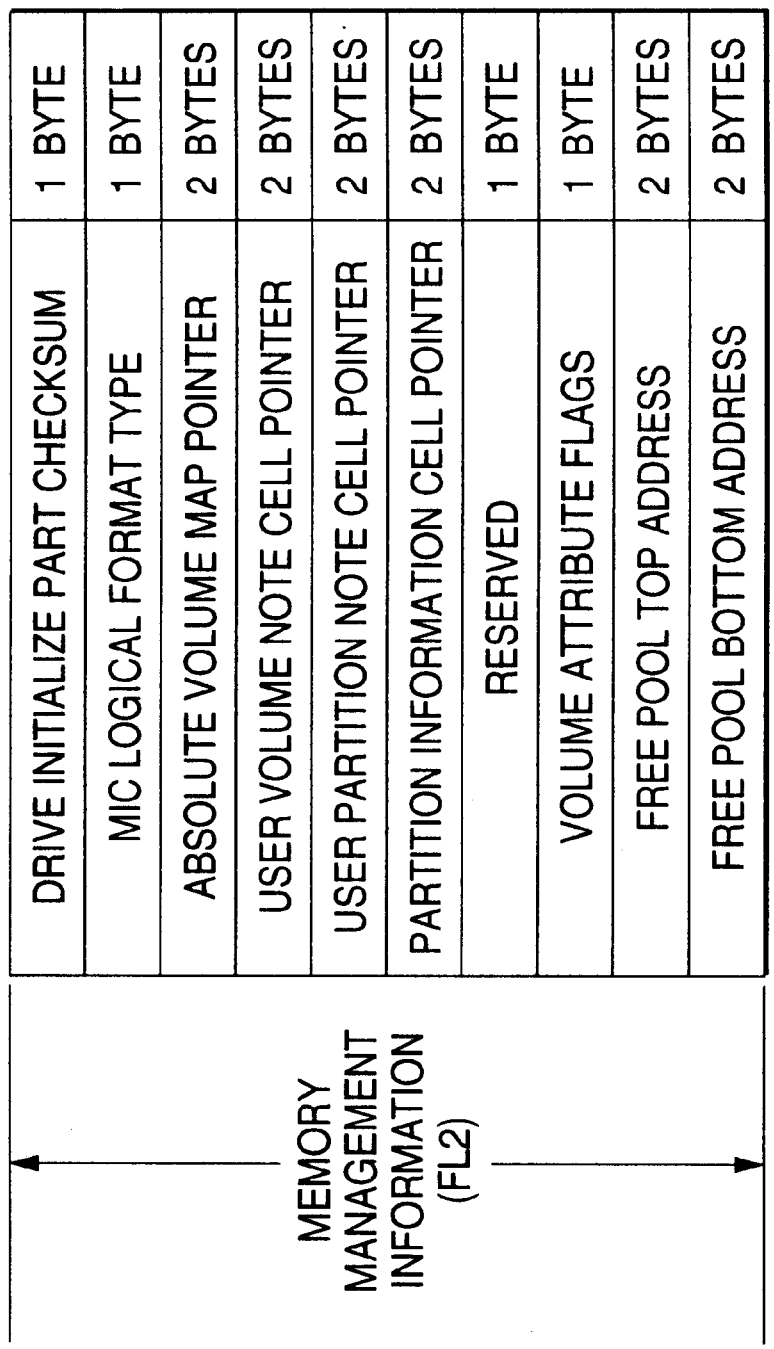
FIG. 9 is a table for explaining Drive Initialize of the MIC of the embodiment.

Following to that, the structure of memory management information of field FL 2 in FIG. 7 will be explained with reference to FIG. 9. A size (number of bytes) of each data is indicated on the right side of the figure.

Information on checksum for data of the memory management information which is the drive initialize part is stored in the memory management information as Drive Initialize Part Checksum at first.

Then, information from MIC Logical Format Type to Free Pool Bottom Address is described as actual data composing the memory management information.

At first, an ID number of a logical format of the MIC is stored as MIC Logical Format Type. Beside the fundamental MIC format, there exit various MIC formats related to firmware update tape MIC format, reference tape MIC format and cleaning cassette MIC format for example. Then, ID number corresponding to the MIC format of the tape cassette concerned is indicated therein.

A pointer indicating the head address of the area of Super High Speed Search Map Cell in FIG. 7 is disposed in Absolute Volume Map Pointer.

User Volume Note Cell Pointer indicates a storage area from/to which the user can read/write freely from/to the tape cassette via the SCSI, i.e., the starting address of User Volume Note Cell shown in FIG. 7.

User Partition Note Cell Pointer indicates a storage area where the user can read/write freely from/to each partition via the SCSI, i.e., the starting address of User Partition Note Cell in FIG. 7. It is noted that while there is a case when a plurality of User Partition Note Cells are stored, the User Partition Note Cell Point indicates the starting address of the head cell among the plurality of User Partition Note Cells.

Partition Information Cell Pointer indicates the starting address of Partition Information Cell #0 in FIG. 7.

While partition information written to the memory free pool is formed by a number of Partitions formed on the magnetic tape 3, all Partition Information Cells #0 through #N are linked by the pointer by the link structure. That is, the Partition Information Cell pointer is a route indicating the address of Partition #0 and the pointer of Partition Information Cell thereafter is disposed within the previous Partition Information Cell.

The position of each data is managed within the field FL 4 by the respective pointers (Absolute Volume Map Pointer, User Volume Note Cell Pointer, User Partition Note Cell Pointer and Partition Information Cell Pointer) as described above.

Volume Attribute Flags are one byte flags for providing logical write inhibit tab to the MIC 4. That is, the contents of the MIC header flag indicates write enable/inhibit of the manufacture part portion or write enable/inhibit of a portion other than the manufacture part.

Free Pool Top Address and Free Pool Bottom Address indicate the starting and ending addresses of the memory free pool in the field FL 4 at the point of time. Because the area as the memory free pool changes corresponding to data written or erased such as Partition Information and User Partition Note, Free Pool Top Address and Free Pool Bottom Address are updated corresponding to that.

Next, the structure of Volume Tag in Field FL 3 in FIG. 7 will be explained with reference to FIG. 10. A size (number of bytes) of each data is shown on the right side of the figure.

Information on checksum for data in Volume Information in which fundamental management information of the whole tape cassette is stored is stored at the head of the Volume Tag as Volume Information Checksum.

Further, information on checksum for data in Accumulative Partition Information in which history information from the manufacturing time of the tape cassette is stored is stored as Accumulative Partition Information Checksum.

It is noted that the area of 101 bytes composed of Volume Information Checksum and Volume Information described above is indicated as Field FL31 and the area of 56 bytes as Accumulative Partition Information described above as Field FL32 for convenience of the explanation hereinbelow.

Serial numbers of character information of 32 characters based on ASCII code for example are stored in Cartridge Serial Number following to Volume Note Checksum and Volume Note.

A code number of the manufacturer of the tape cassette 1 is stored in Manufacturer ID as a manufacturer identifier.

Secondary ID is a secondary identifier corresponding to the type of the tape cassette 1 wherein attribute information of the tape is stored as a code value of 1 byte for example.

Cartridge Serial Number Part Checksum is checksum information of the Cartridge Serial Number, Manufacturer ID and Secondary ID described above.

Each area of Specific Volume Tags 1 through 13 is composed of 36 bytes as reserve for example.

Next, the structure of Volume Information (and Volume Information Checksum) as Field FL31 shown in FIG. 10 will be explained with reference to FIG. 11.

Figure 11:
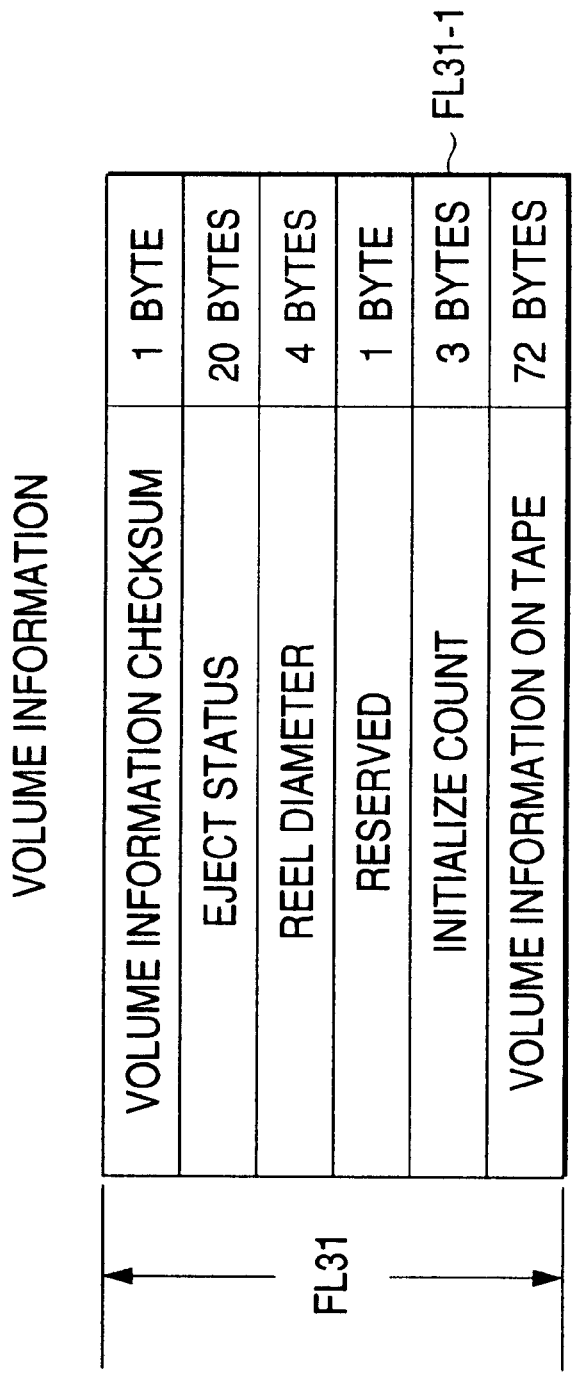
FIG. 11 is a table for explaining the structure of Volume Information of the MIC of the embodiment.

As shown in FIG. 11, information of checksum for data of Volume Information is stored in the first 1 byte of Volume Information as Volume Information Checksum.

Then, as actual data composing Volume Information, Eject Status of 20 bytes, Reel Diameter of 4 bytes, Intialize Court of 3 bytes and Volume Information On Tape of 72 bytes are described.

Information on the logical position of the magnetic tape 3 when the tape cassette is unloaded is described in Eject Status.

It is information on the diameter of the both reel hubs 2A and 2B at the point of time when the tape cassette is unloaded from the reel.

Initialize Count is information on a number of times of initialization implemented on the magnetic tape 3 so far.

Fixed management information regarding to the whole magnetic tape such as Super High Speed Search Enable Flag, System Log Allocation Flags, Always Unload PBOT Flag, AIT/DDS Flag, Last Valid partition Number and Optional Device Area Allocation Map are described and stored in Volume Information On Tape. The detailed explanation thereof will be omitted here.

The structure of Accumulative Partition Information shown as Field FL32 in FIG. 10 will be explained below. It is noted that a number of bytes of each are shown in the right side of the figure.

Information on history (previous information) of various processes implemented from the time when the tape cassette 1 has been loaded till when it is loaded is indicated in Accumulative Partition Information.

As the previous information, information on a number of groups within a partition recorded on the magnetic tape 3 during the previous loading period is indicated at first in Previous Number Of Groups Written. Information on number of times of RAW (Read After Write) during the previous loading period is indicated in Previous RAW Retries.

Information on a number of groups in a partition read from the magnetic tape 3 during the previous loading period is indicated in Previous Number Of Groups Read.

Information on number of times of error correction implemented by using C3 Parity during the previous loading period is indicated in Previous C3 ECC.Retries.

These previous information area updated by current information stored in the work memory (S-RAM 24) described before for example.

Information on accumulative history of various processes implemented from the time when the tape cassette 1 has been initialized in the first format till now is indicated in Accumulative Partition Information. That is, each value in which the previous information is accumulated (total information) and other various accumulative values are stored therein.

That is, these accumulative history information are held even when the tape cassette is reformatted for example.

Information on a number of groups within a partition recorded on the magnetic tape 3 is indicated in Total Number Of Groups Written as an accumulative value from when it has been initialized for the first time.

A number of times of RAW is indicated in Total RAW Retries as an accumulative value.

A number of groups in a partition read from the magnetic tape 3 are indicated in Total Number Of Groups Read as an accumulative value.

A number of times of error correction implemented by using the C3 Parity is indicated in Total C3 ECC Retries as an accumulative value.

That is, these total information become values corresponding to the accumulative values of the previous information.

A number of loaded times of the tape cassette is indicated in Load Count as an accumulative value.

A number of times of access to a partition is indicated in Access Count as an accumulative value.

A number of rewritten times of the partition is indicated in Update Replace Count as an accumulative value.

It is noted that for convenience of the explanation hereinbelow, the area as Total C3 ECC Retries described above will be indicated as Field FL32-1 and the area as Total RAW Retries described above as Field FL32-2.

Next, the cell stored in Field FL 4 shown in FIG. 7 will be explained.

Partition Information Cells, User Partition Note Cells and others are stored in Field FL4 as described before.

FIG. 13 shows the structure of each of these cells.

Figure 13A:
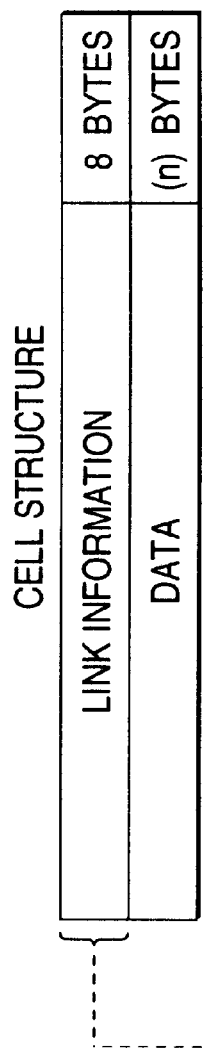
FIGS. 13A and 13B are tables for explaining the structure of Cell of the MIC of the embodiment.

One cell is composed of Link Information of 8 bytes and Data of n bytes (which differs depending on the type of a cell) as shown in FIG. 13A.

Figure 13B:
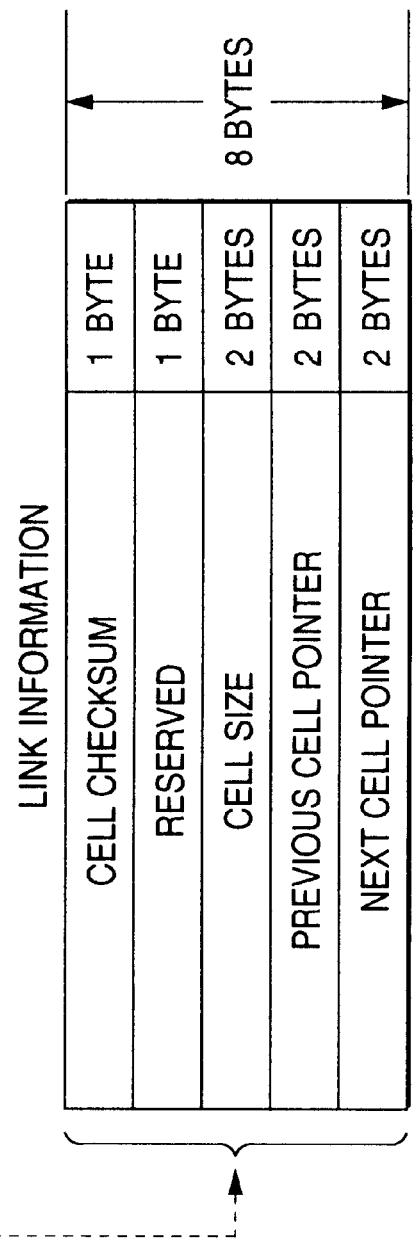

Link Information of 8 bytes is provided in each cell and has the structure as shown in FIG. 13B.

Cell Checksum of 1 byte is provided at first as a checksum concerning to data within the cell. Further, the size of the cell is indicated as Cell Size of 2 bytes.

Previous Cell Pointer and Next Cell Pointer are actual linkage data (data configuring the link structure) and the previous and next cells are designated by the previous cell pointer and the next cell pointer in linking a plurality of cells of the same kind.

There exist Partition Information Cell, Absolute Volume Map Information Cell, User Volume Note Cell and User Partition Note Cell as cells having such structure. Although the cell size of the Partition Information Cell is fixed, the cell size of the other cells is variable.

While the data structure of the MIC 4 is constructed as explained above with reference to FIGS. 7 through 13, such data structure of the MIC 4 is merely an example to the end and the disposition of data, setting of the areas, the contents of the data, the data size and the like are not limited to those described above.

5. Mode of Use of Initialize Count in the Present Embodiment:

As shown by FIG. 11 in the explanation so far, the information on Initialize Count is defined and is stored with respect to the MIC 4 in the present embodiment. That is, the information on a number of times of initialization implemented on the magnetic tape of the tape cassette concerned is stored.

This information on Initialize Count is information which should not be initialized (cleared) by nature along the initialization implemented on the magnetic tape.

Even if such information is set so as to be recorded in the system area of the magnetic tape in a tape cassette having no MIC, the system area is cleared along the initialization as described above. Therefore, in order to record a number of times of initialization accurately per initialization in the system area on the magnetic tape, the tape streaming drive must grasp by the number of times of initialization so far by any means in the stage before the initialization for example. However, it is difficult to realize technically.

However, the present embodiment readily allows the contents of Initialize Count to be set without being cleared even if initialization is implemented on the magnetic tape by the format of the MIC by arranging so as to store Initialize Count in the MIC 4 separated from the magnetic tape.

Then, the tape streaming drive 10 of the present embodiment can recognize the number of times of initialization implemented at least on the magnetic tape of the tape cassette presently loaded by reading the information on Initialize Count from the MIC 4 of the loaded tape cassette.

The operation of the tape streaming drive 10 for updating Initialize Count corresponding to the initialization on the magnetic tape will be explained briefly. No flowchart will be shown here.

When the tape cassette 1 is loaded to the tape streaming drive 10 for instance, the system controller 15 reads information stored in the MIC 4 of the loaded tape cassette 1 and holds it in the SRAM 24. The contents of the MIC held in the SRAM 24 is updated regarding to certain information one after another corresponding to the recording/reproducing operation implemented on the magnetic tape.

Here, when a command for initializing the magnetic tape is transmitted from the host computer 40 for example, the system controller 15 executes a control process for initializing the magnetic tape.

Then, when the initialization on the magnetic tape is completed, the system controller 15 updates the contents of information of MIC held in the SRAM 24 corresponding to the initialization. In concrete, as for the contents of various information as the MIC header, fixed information which needs not be updated is not rewritten and information which needs to be updated along the initialization such as information regarding to partition for example is updated. Initialize Count is one of information which should be updated along the initialization and is updated by incrementing the value held so far by one. The information in Memory Free Pool as the field FL4 is cleared along the initialization.

Then, when a command for ejecting the loaded tape cassette is sent from the host computer 40 for example, the contents of information of MIC in the SRAM 24 updated as described above is rewritten by transferring to the MIC 4 having a certain chance. Thereby, the contents of information of the MIC 4 in the tape cassette 1 coincides with the history of use of the tape so far. Accordingly, Initialize Count of the magnetic tape of the tape cassette coincides with the actual number of times of initialization.

While various modes of use of the information (Initialize Count) on the number of times of initialization thus obtained as described above are conceivable, it is possible to arrange so that the host computer 40 receives the information on Initialize Count and the present the number of times of initialization of the tape cassette presently loaded in the tape streaming drive 10. Thereby, it becomes convenient for the user who wants to grasp the number of times of initialization of the magnetic tape because the user needs not to manage the number of times of initialization by himself.

The present embodiment also proposes a method for grasping a degree of damage of the magnetic tape accurately based on Initialize Count as explained below.

Figures 14A, 14B:
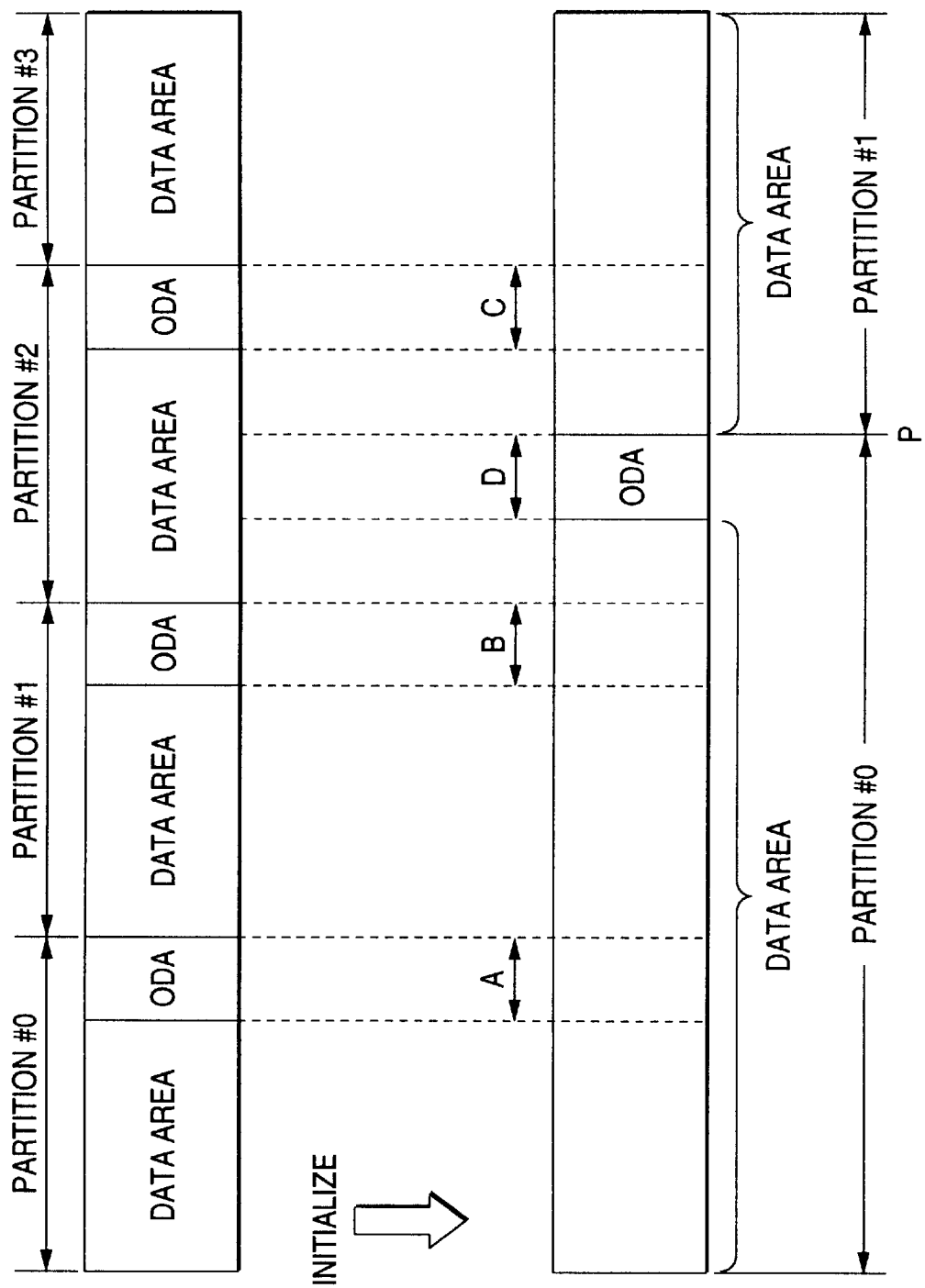
FIGS. 14A and 14B are diagrams for explaining the transition in which Optical Device Area is contained in Data Area along initialization.

Here, suppose that there exists a magnetic tape of a tape cassette which has been initialized as shown in FIG. 14A and to/from which data is recorded/reproduced.

Suppose also that four partitions of Partitions #0 through #3 are formed in the previous initialization in the magnetic tape shown in FIG. 14A. Then, Optional Device Area (denoted as ODA in the figure) at the end of Partitions #0 through #2 except of the last Partition #3 among the Partitions #0 through #3 as explained in FIG. 6. In the figure, the physical sections on the magnetic tape corresponding to each Optional Device Area as Partitions #0 through #2 are shown as sections A, B and C, respectively.

It is noted that in the figure, areas such as system area and EOD in each partition are omitted.

Optional Device Area (ODA) is the area for loading/unloading the tape in recording/reproducing data corresponding to a partition located right after it as explained in FIG. 6.

In loading/unloading the tape, the operation for leading the magnetic tape from the tape cassette or for returning the magnetic tape which has been wound around the rotary head to the tape cassette is carried out by a loading/unloading mechanism provided with various guide pins as publicly known. In a certain aspect, it may be considered that stress is given to the magnetic tape which is loaded/unloaded as described above.

Further, while the rotary drum 11 normally rotates during loading/unloading, the magnetic head provided on the rotary drum 11 contacts with the tape surface so as to pass through from the upper end to the lower end along the helical direction of the magnetic tape surface corresponding to the rotation of the rotary drum 11 when the magnetic tape is wound around the rotary drum during the loading for example. Then, when the magnetic head reaches the upper end of the magnetic tape, there is a case when the gap of the magnetic heads and a small step between the side of the rotary head and the magnetic head are caught by the upper end of the magnetic tape, thus damaging the edge of the magnetic tape more or less.

Therefore, when data is recording/reproduced repeatedly to/from the magnetic tape shown in FIG. 14A, i.e., when the loading/unloading operation is carried out repeatedly to the Optional Device Area (ODA), the physical sections A, B and C of the magnetic tape, i.e., the Optional Device Areas (ODA), are more likely to be damaged as compared to the other sections of the magnetic tape.

Then, suppose that the user initializes the magnetic tape shown in FIG. 14A for example. Suppose also that two Partitions #0 and #1 are formed in this initialization so that they are parted at the tape position P as shown in FIG. 14B for example. Here, the section D is Optional Device Area (ODA) of Partition #0.

When the magnetic tape is initialized as described above, the physical sections A, B and C which have been the Optional Device Areas (ODA) in the stage before the initialization are handled as data area of Partition #0 or Partition #1. Although they are shown diagrammatically in the figure, actually it may happen inevitably that a section which has been Optional Device Area (ODA) before turns out to be a data area anew by initialization. A number of Optional Device Areas (ODA) containing in the data area increases as the number of times of initialization increases.

That the section which has been Optional Device Area (ODA) in the past is contained in the data area formed after the initialization means that a magnetic tape area whose degree of damage is higher than the other area is contained in the area where the user's data is to be recorded/reproduced, i.e., the data area.

Then, when the degree of damage is considerably high, there is a case when an error occurring rate becomes higher in the section which has been Optional Device Area (ODA) in the past as compared to the other area in recording/reproducing data. That is, it becomes a factor of lowering the reliability in recording/reproducing data.

Then, the more the number of times of initialization, the more the number of areas which have been Optional Device Areas (ODA) in the past increases within the data area, thus increasing the area which may not be reliable in recording/reproducing data.

Figure 12:
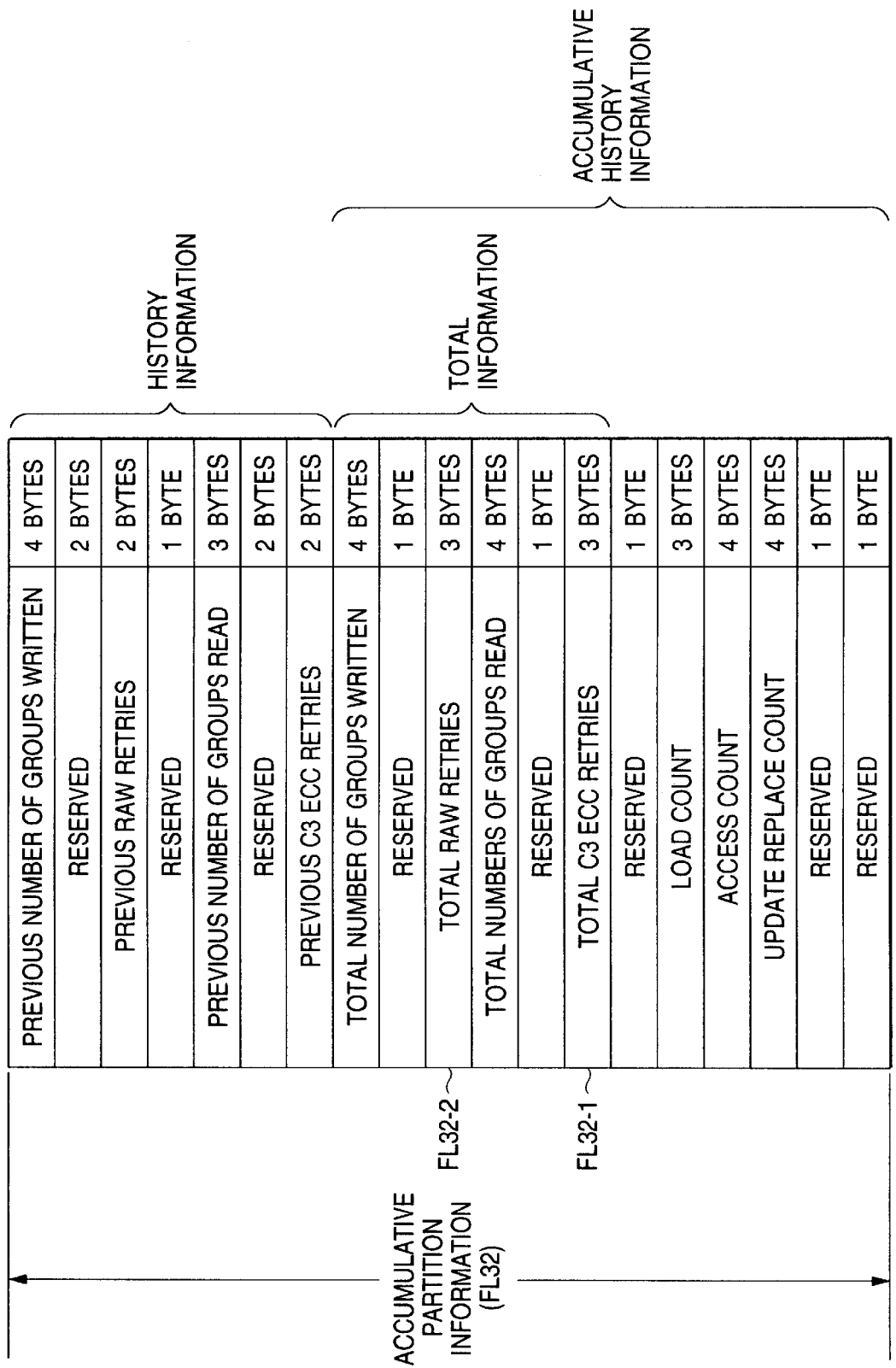
FIG. 12 is a table for explaining the structure of Accumulative Partition Information of the embodiment.

For instance, Total C3 ECC Retries indicated as Field FL32-1 within Accumulative partition Information in FIG. 12 for example may be cited as information for calculating the reliability of the magnetic tape in recording/reproducing data (or the degree of damage of the magnetic tape indirectly). Because this information corresponds to a number of times of occurrence of error which is relatively significant and which requires to use C3 Parity in reproduced data, a value of this information allows the reliability of the magnetic tape in recording/reproducing data to be grasped by a certain degree.

However, an area whose error has been corrected by using the C3 Parity is not always the section which has been Optional Device Area (ODA) in the past within the data area and even when the area whose error has been corrected by using C3 Parity is the section which has been Optional Device Area (ODA) in the past, the degree of damage of the section which has been Optional Device Area (ODA) in the past varies and the result obtained by correcting the error by using the C3 Parity is not always obtained equally in all sections which have been Optional Device Areas (ODA) in the past.

That is, it is difficult to calculate the degree of damage of the magnetic tape which is considered to have been caused directly by the inclusion of the section which has been Optional Device Area (ODA) in the past just by the information of Total C3 ECC Retries.

Then, it becomes possible to estimate the degree of damage of the magnetic tape accurately by adding the information of Initialize Count to the value of the Total C3 ECC Retries described above rather than depending only on the Total C3 ECC Retries. That is, the number of times of occurrence of error correction by the C3 Parity is handled as a numerical value almost corresponding to defective parts of the actual magnetic tape and information on the number of times of initialization as Initialize Count is handled as a weighting function corresponding to potential defective parts.

Although the detailed explanation on how to compute by utilizing the value of the Total C3 ECC Retries and the value of Initialize Count will be omitted here because various methods are conceivable, more accurate information may be obtained by multiplying the value of the Total C3 ECC Retries with the value of Initialize Count as compared to the case of computing the degree of damage corresponding only to the value of Total C3 ECC Retries.

It is noted that because the value of Total RAW Retries indicated as Field FL32-2 corresponds to the number of times of occurrence of errors during recording in Accumulative Partition Information in FIG. 12, it may be used instead of the value of Total C3 ECC Retries.

A processing transition diagram in FIG. 15 shows processing operations as a system configured so as to allow the user to grasp the degree of damage of the magnetic tape as an example in which the measurement of the degree of damage of the magnetic tape described above is applied concretely.

The processing transition diagram in FIG. 15 exemplifies a case of presenting the degree of damage of the magnetic tape of the tape cassette currently loaded in the tape streaming drive 10 to the user by displaying it as a process of a predetermined application software in the host computer 40.

Suppose that the user manipulates in a certain manner so as to display the degree of damage of the magnetic tape of the tape cassette currently loaded in the tape streaming drive 10 on the side of the host computer 40. Then, the specific application software which has been activated by the host computer 40 sends a command for requesting to send at least Initialize Count of that partition and Total C3 ECC Retries to the tape streaming drive 10 as indicated as Step S101 as a processing operation corresponding to the manipulation described above. It is noted that the command is sent via the SCSI bus. The processing operations of the host computer 40 hereinbelow are executed by the specific application software described above.

The system controller 15 of the tape streaming drive 10 receives the commands via the SCSI interface 20 as shown as a process of Step S102.

Then, as an internal processing operation responding to the receipt of this command, Initialize Count and Total C3 ECC Retries are read from the MIC 4 of the currently loaded tape cassette 1 as indicated as Step S103 at first.

Then, as a process of Step S104, Initialize Count and Total C3 ECC Retries read from the MIC 4 are sent to the host computer 40 from the SCSI interface 20 via the SCSI bus in accordance to a SCSI transmission format.

The host computer 40 receives Initialize Count and Total C3 ECC Retries sent from the tape streaming drive 10 and holds them in the internal RAM for example.

Then, the host computer 40 measures the degree of damage of the magnetic tape by executing certain computing processes by utilizing Initialize Count and Total C3 ECC Retries held in the RAM in the process of Step S106.

Then, in the following Step S107, the host computer 40 executes a process for displaying the degree of damage of the magnetic tape obtained in Step S106 described above on a display for example by a predetermined display mode so that it can be seen visually.

Seeing the degree of damage of the magnetic tape thus displayed, the user can make an adequate judgment whether to use the tape cassette continuously in the same manner with the past, not to record important data in the tape cassette or to discard the tape cassette by considering that its life is short in some cases.

It is noted that the communicating process between the host computer 40 and the tape streaming drive 10 conforming to the communication format as the SCSI interface for example is briefly shown as the processing operation.

Further, although the host computer 40 calculates the degree of damage of the magnetic tape by utilizing the received Initialize Count and Total C3 ECC Retries in the processing operations described above, the following process is also conceivable.

For instance, the host computer 40 sends a command for requesting to inform the degree of damage of the magnetic tape. Then, corresponding to this request to inform, the system controller 15 of the tape streaming drive 10 reads Initialize Count and Total C3 ECC Retries from the MIC 4 and measures the degree of damage of the magnetic tape by implementing a certain computing process for example. Then, it sends the information on the degree of damage of the magnetic tape to the host computer 40.

The applicant of the present specification has also proposed one which is arranged so as to be able to make the communication between the MIC 4 and the system controller 15 on wireless, the present invention is applicable also to such system.

Still more, the tape streaming drive using the recording medium of the 8 mm VTR tape cassette has been exemplified in the present embodiment, the present invention is applicable also to a tape streaming drive using a recording medium of another type of tape cassette as long as it is provided with the memory device in which defined management information can be stored.

Accordingly, it should be understood that variations to the embodiment described above will occur to those skilled in the art within the scope of the present inventive concepts which are delineated by the following claims.

What is claimed is:

1. A recording medium, comprising:

a tape cassette for accommodating a magnetic tape; and a memory provided in said tape cassette for storing management information for managing a recording/reproducing operation on said magnetic tape, wherein said memory includes a storage area for storing initialization information indicating a number of times said magnetic tape has been initialized, and said initialization information is not cleared upon a subsequent initialization of said magnetic tape.

2. The recording medium according to claim 1, wherein said storage area of said memory is a first storage area and said memory further includes a second storage area for storing error correction information indicating a number of times error correction was required when recording/reproducing data to/from said magnetic tape, and said initialization information and said error correction information are used in measuring a degree of damage of said magnetic tape.

3. A tape driving apparatus, comprising:

tape driving means for recording/reproducing information to/from a magnetic tape when a tape cassette accommodating said magnetic tape is loaded therein;

memory driving means for reading/writing management information from/to a memory when said tape cassette is provided with said memory, wherein said management information is for managing a recording/reproducing operation to/from said magnetic tape;

initializing means for initializing said magnetic tape of said tape cassette; and control means for controlling said memory driving means so as to update said management information with initialization information indicating a number of times said magnetic tape has been initialized by said initializing means, wherein said initialization information is not cleared upon a subsequent initialization of said magnetic tape.

4. A tape driving apparatus, comprising:

tape driving means for recording/reproducing information to/from a magnetic tape when a tape cassette accommodating said magnetic tape is loaded therein; and memory driving means for reading/writing management information from/to a memory for storing management information for managing a recording/reproducing operation to/from said magnetic tape when said memory is provided in said tape cassette, wherein said memory driving means updates said management information with initialization information indicating a number of times said magnetic tape has been initialized, and said initialization information is not cleared upon a subsequent initialization of said magnetic tape.

5. The tape driving apparatus according to claim 4, wherein said memory further stores error correction information indicating a number of times error correction was required when recording/reproducing data to/from said magnetic tape, and said memory driving means uses said initialization information and said error correction information to measure a degree of damage of said magnetic tape.

* * * * *